United States Patent
Sahni et al.

(10) Patent No.: US 10,621,658 B1
(45) Date of Patent: Apr. 14, 2020

(54) IDENTITY VERIFICATION SERVICES WITH IDENTITY SCORE THROUGH EXTERNAL ENTITIES VIA APPLICATION PROGRAMMING INTERFACE

(71) Applicant: Wells Fargo Bank, N.A., San Francisco, CA (US)

(72) Inventors: Bipin M. Sahni, Pleasanton, CA (US); Nikolai Stroke, Gilbert, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 704 days.

(21) Appl. No.: 14/597,374

(22) Filed: Jan. 15, 2015

(51) Int. Cl.
  *G06Q 40/02* (2012.01)
  *G06Q 50/26* (2012.01)
  *G06Q 30/06* (2012.01)

(52) U.S. Cl.
  CPC ............. *G06Q 40/02* (2013.01); *G06Q 30/06* (2013.01); *G06Q 50/265* (2013.01)

(58) Field of Classification Search
  CPC .......... G06Q 20/4016; G06Q 20/4014; G06Q 20/405; G06Q 20/40; G06Q 20/4012; G06Q 30/0248; G06Q 20/206; G06Q 20/3674; G06Q 30/00; G06Q 30/0601; G06Q 30/0637
  See application file for complete search history.

(56) References Cited

U.S. PATENT DOCUMENTS

| | | |
|---|---|---|
| 6,347,306 B1 | 2/2002 | Swart |
| 7,249,097 B2 | 7/2007 | Hutchison et al. |
| 7,356,506 B2 * | 4/2008 | Watson .................. G06Q 10/10 705/39 |
| 7,444,676 B1 | 10/2008 | Asghari-Kamrani et al. |
| 7,523,068 B2 | 4/2009 | Britney et al. |
| 7,536,326 B2 | 5/2009 | Tyson-Quah |

(Continued)

FOREIGN PATENT DOCUMENTS

WO  WO-2017/160877 A1  9/2017

OTHER PUBLICATIONS

Roos, Dave. "How to Leverage an API for Conferencing." Oct. 20, 2014. (https://web.archive.org/web/20141020185109/https:money.howstuffworks.com/business-communications/how (Year: 2014).*

(Continued)

*Primary Examiner* — Elda G Milef
(74) *Attorney, Agent, or Firm* — Foley & Lardner LLP

(57) ABSTRACT

The described financial institution computing system provides services to customers through an application programming interface ("API"). The services include user identification services to customers. The user identification services allow the customers to verify the identity of users as non-fraudulent users. Further the user identification services allow the financial institution to provide known user information to the customers for purposes of prepopulating registration forms, completing transactions, and the like. Further services, such as user account validation services, payment services, and the like are also possible through the financial institution APIs. In some situations, users are registered with the financial institution. For example, a user may also be an account holder with the financial institution. In other situations, the users are not registered with the financial institution.

25 Claims, 8 Drawing Sheets

(56) References Cited

U.S. PATENT DOCUMENTS

| | | |
|---|---|---|
| 7,729,994 B2 | 6/2010 | Gupta et al. |
| 7,831,521 B1 | 11/2010 | Ball et al. |
| 7,870,078 B2 * | 1/2011 | Clark .................. G06Q 30/0185 |
| | | 705/318 |
| 7,890,393 B2 | 2/2011 | Talbert et al. |
| 8,301,500 B2 | 10/2012 | Pharris |
| 8,352,323 B2 | 1/2013 | Fisher |
| 8,412,625 B2 | 4/2013 | Pilo' |
| 8,452,708 B1 | 5/2013 | Birenbaum et al. |
| 8,453,925 B2 * | 6/2013 | Fisher .................. G06Q 20/24 |
| | | 235/375 |
| 8,527,408 B2 | 9/2013 | Campbell et al. |
| 8,606,670 B2 | 12/2013 | Patton |
| 8,745,194 B2 | 6/2014 | Uribe-Etxebarria Jimenez |
| 8,818,870 B2 | 8/2014 | Fisher |
| 9,135,618 B1 | 9/2015 | Dorsey et al. |
| 9,378,356 B2 | 6/2016 | Rockwell |
| 9,471,913 B1 | 10/2016 | Kaptcan et al. |
| 9,495,699 B2 | 11/2016 | Mangaru et al. |
| 9,633,341 B2 | 4/2017 | Kim et al. |
| 9,646,297 B2 | 5/2017 | Van Den Broeck et al. |
| 9,665,854 B1 * | 5/2017 | Burger .................. G06Q 20/00 |
| 9,779,436 B2 | 10/2017 | Bui |
| 9,846,872 B2 | 12/2017 | Hogg et al. |
| 9,876,803 B2 | 1/2018 | Miu et al. |
| 9,892,386 B2 | 2/2018 | Liberty |
| 9,922,381 B2 | 3/2018 | Isaacson et al. |
| 9,990,621 B1 | 6/2018 | Ng et al. |
| 10,055,740 B2 | 8/2018 | Hanson et al. |
| 10,062,072 B2 | 8/2018 | Davis et al. |
| 10,062,073 B2 | 8/2018 | Baldie |
| 10,068,295 B1 | 9/2018 | Allen |
| 10,073,953 B2 | 9/2018 | Xing |
| 10,083,427 B2 | 9/2018 | Cummins et al. |
| 10,089,617 B2 | 10/2018 | Royyuru et al. |
| 10,121,129 B2 | 11/2018 | Kalgi |
| 10,121,133 B2 | 11/2018 | Nelms et al. |
| 10,127,549 B2 | 11/2018 | Keresman et al. |
| 10,148,659 B2 | 12/2018 | Nandakumar |
| 10,157,375 B2 | 12/2018 | Balasubramanian et al. |
| 10,163,086 B2 | 12/2018 | Keresman et al. |
| 10,181,119 B2 | 1/2019 | Cyr et al. |
| 10,181,162 B2 | 1/2019 | Drury et al. |
| 10,185,954 B2 | 1/2019 | Mizhen et al. |
| 10,210,345 B2 | 2/2019 | Beye et al. |
| 10,210,514 B2 | 2/2019 | Musser et al. |
| 2002/0181710 A1 | 12/2002 | Adam et al. |
| 2004/0177047 A1 * | 9/2004 | Graves .................. G06Q 20/02 |
| | | 705/71 |
| 2005/0262026 A1 * | 11/2005 | Watkins .................. G06Q 20/02 |
| | | 705/67 |
| 2006/0129896 A1 | 6/2006 | Rohn |
| 2006/0277128 A1 | 12/2006 | Anandarao et al. |
| 2007/0288377 A1 * | 12/2007 | Shaked .................. G06Q 20/04 |
| | | 705/44 |
| 2008/0052183 A1 * | 2/2008 | Hobson .................. G06Q 20/02 |
| | | 705/26.1 |
| 2008/0086417 A1 | 4/2008 | Bykov et al. |
| 2008/0167944 A1 | 7/2008 | Keithley et al. |
| 2008/0288405 A1 | 11/2008 | John |
| 2009/0076934 A1 | 3/2009 | Shahbazi et al. |
| 2009/0089190 A1 | 4/2009 | Girulat, Jr. |
| 2009/0249448 A1 | 10/2009 | Choi et al. |
| 2009/0320106 A1 | 12/2009 | Jones et al. |
| 2010/0094719 A1 | 4/2010 | Sines et al. |
| 2010/0169223 A1 | 7/2010 | Yuan |
| 2011/0137804 A1 | 6/2011 | Peterson |
| 2013/0103578 A1 | 4/2013 | Mallean et al. |
| 2013/0179957 A1 | 7/2013 | Takata et al. |
| 2013/0198066 A1 | 8/2013 | Wall et al. |
| 2013/0339231 A1 | 12/2013 | Chaitanya |
| 2014/0129435 A1 | 5/2014 | Pardo et al. |
| 2014/0258136 A1 * | 9/2014 | Ellis .................. G06Q 20/4016 |
| | | 705/76 |
| 2015/0019423 A1 | 1/2015 | Dowling et al. |
| 2015/0026061 A1 * | 1/2015 | Siegel .................. G06Q 20/4016 |
| | | 705/44 |
| 2015/0039452 A1 | 2/2015 | Barve et al. |
| 2015/0058931 A1 * | 2/2015 | Miu .................. H04L 63/126 |
| | | 726/3 |
| 2015/0242834 A1 | 8/2015 | Goldsmith et al. |
| 2015/0242949 A1 | 8/2015 | Phillips, IV |
| 2015/0278811 A1 | 10/2015 | Lalchandani et al. |
| 2016/0189145 A1 | 6/2016 | William |
| 2017/0004719 A1 | 1/2017 | Laud et al. |
| 2017/0286958 A1 | 10/2017 | Herman |
| 2017/0308880 A1 | 10/2017 | Phillips et al. |
| 2018/0025333 A1 | 1/2018 | Cunningham |
| 2018/0121896 A1 | 5/2018 | Potadar |
| 2018/0130051 A1 | 5/2018 | Matthews et al. |
| 2018/0150823 A1 | 5/2018 | Omojola et al. |
| 2018/0150826 A1 | 5/2018 | Schwartz et al. |
| 2018/0165659 A1 * | 6/2018 | Raouda El-Balah ........................ G06Q 20/0453 |
| 2018/0189778 A1 | 7/2018 | Grassadonia et al. |
| 2018/0225789 A1 | 8/2018 | Cook |
| 2018/0240095 A1 | 8/2018 | Buckley et al. |
| 2019/0012646 A1 | 1/2019 | Seidl et al. |
| 2019/0034393 A1 | 1/2019 | Rose |
| 2019/0043138 A1 | 2/2019 | Blake et al. |
| 2019/0066090 A1 | 2/2019 | Mei et al. |

OTHER PUBLICATIONS

Wall, Quinton. APIs are Bridging the Mobile App Gap. Mar 4, 2014. https://www.recode.net. (Year: 2014).*

* cited by examiner

IDENTITY VERIFICATION SERVICES WITH IDENTITY SCORE THROUGH EXTERNAL ENTITIES VIA APPLICATION PROGRAMMING INTERFACE

CROSS-REFERENCE TO RELATED APPLICATIONS

This application is related to U.S. patent application Ser. No. 14/597,339, titled "IDENTITY VERIFICATION SERVICES AND USER INFORMATION PROVISION VIA APPLICATION PROGRAMMING INTERFACE," filed on the same date as the present application, to U.S. patent application Ser. No. 14/597,344, titled "IDENTITY VERIFICATION SERVICES VIA APPLICATION PROGRAMMING INTERFACE," filed on the same day as the present application, and to U.S. patent application Ser. No. 14/597,331, titled "PAYMENT SERVICES VIA APPLICATION PROGRAMMING INTERFACE," filed on the same day as the present application, each of which are incorporated by reference in their entireties and for all purposes.

BACKGROUND

Entities and people often share information via computing systems during normal business transactions. For example, a customer of a retailer may log into the retailer's website via his mobile phone or access the retailer's smartphone application via his mobile phone. The customer may be required to create a profile with the retailer in order to proceed with a purchase from the retailer. During the process of setting up the profile, the customer provides personal information, such as the customer's name, addresses, payment information, billing information, and the like. The retailer uses the information to setup and maintain customer accounts. In some arrangements, the retailer also uses the information to process purchase orders for purchases made through the website and application. However, it is often difficult for the retailer to truly verify that the customer is who the customer purports to be based on the provided information. Accordingly, the retailer is at risk of facilitating fraudulent transactions attributed to potential victims of identity theft.

SUMMARY

One embodiment relates to a method of verifying a user to a customer from a financial institution computing system of a financial institution. The method includes receiving, by a processor of the financial institution computing system, user information and a verification request from a customer device, wherein the customer device provides a website or a mobile application of a customer to a plurality of user devices, wherein the user information was provided by a user device to the customer device. The method further includes transmitting, by the processor, the user information to an external service provider. The method includes receiving, by the processor, verification information from the external service provider, wherein the verification information indicates whether the provided user information matches known user information and an indication of any discrepancies in the user information. The method further includes calculating, by the processor, a validation score based at least in part on the verification information received from the external service provider. The validation score is an indication as to the chances the user is fraudulently misrepresenting the user information to the customer. The method includes transmitting, by the processor, the validation score to the customer device.

Another embodiment relates to a financial institution computing system associated with a financial institution. The system includes a network interface configured to communicate with a customer device, a user device, and an external service provider via a network. The system further includes an account database storing information relating to a plurality of financial accounts maintained by the financial institution and an identity database storing verified personal information relating to a plurality of users. The system includes a memory and at least one processor. The at least one processor is configured to receive user information and a verification request from the customer device, wherein the customer device provides a website or a mobile application of a customer to a plurality of user devices, wherein the user information was provided by the user device to the customer device. The at least one processor is further configured to transmit the user information to the external service provider. The at least one processor is configured to receive verification information from the external service provider, wherein the verification information indicates whether the provided user information matches known user information and an indication of any discrepancies in the user information. The at least one processor is further configured to calculate a validation score based at least in part on the verification information received from the external service provider. The validation score is an indication as to the chances the user is fraudulently misrepresenting the user information to the customer. The at least one processor is configured to transmit the validation score to the customer device.

A further embodiment relates to a non-transitory computer readable media with computer-executable instructions embodied thereon that, when executed by a processor of a financial institution computing system, cause the financial institution computing system to perform a process of verifying the identity of a user. The process includes receiving user information and a verification request from a customer device, wherein the customer device provides a website or a mobile application of a customer to a plurality of user devices, wherein the user information was provided by the user device to the customer device. The process further includes transmitting the user information to an external service provider. The process includes receiving verification information from the external service provider, wherein the verification information indicates whether the provided user information matches known user information and an indication of any discrepancies in the user information. The process further includes calculating a validation score based at least in part on the verification information received from the external service provider. The validation score is an indication as to the chances the user is fraudulently misrepresenting the user information to the customer. The process includes transmitting the validation score to the customer device.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the figures, a financial institution computing system provides various services to customers through an application programming interface ("API"). Generally, an API is a software-to-software interface that allows computing systems of two different entities to communicate with each other. The API of a first entity may be used by a second entity to access information stored on the computing systems associated with the first entity. In such an arrangement, the information available to the second entity is defined or limited by the first entity. Here, the financial institution computing system provides user identification services to customers. The user identification services allow the customers to verify the identity of users as non-fraudulent users. Further, the user identification services allow the financial institution to provide known user information to the customers for purposes of prepopulating registration forms, completing transactions, and the like. Further services, such as user account validation services, payment services, and the like are also possible through the financial institution APIs. In some situations, users are registered with the financial institution. For example, a user may also be an account holder with the financial institution. In other situations, the users are not registered with the financial institution.

Figure 1:
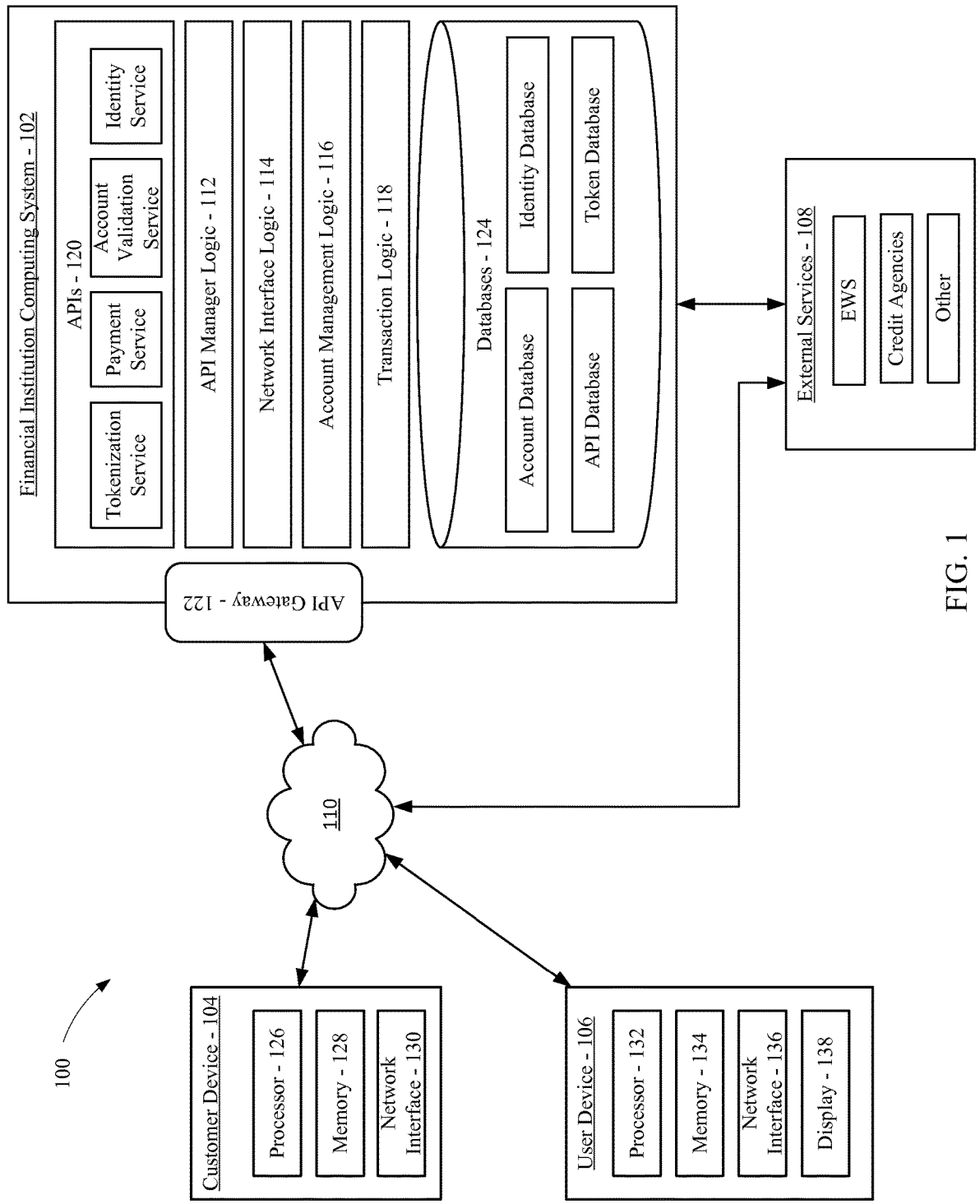
FIG. 1 is a block diagram of a computing system according to an exemplary embodiment.

Referring to FIG. 1, a block diagram of a computing system 100 is shown according to an exemplary embodiment. The computing system 100 includes a financial institution computing system 102. The financial institution computing system 102 is associated with a financial institution. The financial institution provides banking services to individuals and entities (e.g., deposit account services, credit account services, etc.). The financial institution computing system 102 may include various servers and computing systems or may be embodied as a single computing device. The financial institution computing system 102 includes at least one processor and memory to perform the various functions described herein.

The financial institution computing system 102 communicates data with external computing systems such as customer devices 104, user devices 106, and external service providers 108. Customer devices 104 are associated with customers of the financial institution. As used herein, a "customer" is an entity that purchases API services from the financial institution. User devices 106 are associated with users. As used herein, "users" are individuals or entities attempting to interact with customers through the customer devices 104. For example, a user may be a person and a customer may be a retailer, and the user may be attempting to purchase an item from the retailer's website. In some situations, users are also account holders with the financial institution. The external service providers may include the Early Warning Service ("EWS"), credit agencies (e.g., TransUnion, Equifax, and Experian), and other third-party service providers 108 used by the financial institution to verify information associated with users. The communications may occur through a network 110, such as the internet, or may occur directly between the financial institution computing system 102 and other computing systems (e.g., external service providers 108).

The financial institution computing system 102 includes various logic modules that control the operation of the financial institution computing system 102. The logic modules include API manager logic 112, network interface logic 114, account management logic 116, and transaction logic 118. The API manager logic 112 controls the operations of the APIs 120 provided by the financial institution computing system 102. The APIs 120 provide various services to customers and users via an API gateway 122. The services may include a tokenization service, a payment service, an account validation service, and an identity service. The individual services are described in further detail below. The data communications to and from the financial institution computing system 102 are facilitated by a network interface logic 112. The network interface logic 112 includes hardware (e.g., Ethernet controller, memory, etc.) and software necessary to facilitate data communications for the financial institution computing system 102 over the network 110 or directly with an external computing system (e.g., external services 108).

As noted above, the financial institution provides banking services to individuals and entities. These banking services may include the maintenance of deposit and credit accounts, bill payment services, loan services, and the like. Accordingly, the account management logic 116 is used by the financial institution computing system 102 to maintain the various accounts associated with account holders with the financial institution. The account maintenance tasks may include maintaining account balances, account logins and passwords, providing banking websites and smartphone applications to account holders, initiating account statement deliveries, and the like. The transaction logic 118 is used by the financial institution computing system 102 to perform financial transactions associated with maintained accounts. The financial transactions may include credit card processing, account transfers, check processing, automated clearing house ("ACH") transaction processing, deposits, withdrawals, interest payments, and the like.

The financial institution computing system 102 includes various databases 124. The databases may include an account database, an identity database, an API database, and a token database. The account database stores information relating to a plurality of financial accounts associated with a plurality of users maintained by the financial institution. The token database stores token information associated with the tokenization service. The identity database stores information relating to the identities of customers, users, and account holders. The identity database may also store information relating to the identity service. The API database stores information relating to other APIs 120, such as the payment service API.

Still referring to FIG. 1, the customer device 104 includes a processor 126 and a memory 128. The memory 128 stores programming modules that, when executed by the processor 126, control the operation of the customer device 104. In some arrangements, the customer device 104 is a backend server system that provides a website (e.g., an online shopping website) and/or a mobile application (e.g., a smartphone application, a tablet application, etc.) associated with the customer. The customer device 104 further includes a network interface 130 that allows the customer device 104 to send and receive data over the network 110. The user device 104 similarly includes a processor 132 and a memory 134. The memory 134 stores programming modules that, when executed by the processor 132, control the operation of the user device 106. The user device 106 may be a personal computing device associated with a user, such as a laptop, a desktop, a PDA, a smartphone, a tablet computing device, etc. The user device 106 includes a network interface 136 that allows the user device to send and receive data over the network 110. The user device 106 also includes a display 138 that presents graphical user interfaces to the user of the user device 106.

As described in further detail below, the financial institution computing system 102 provides customer devices 104 access to various APIs 120. The APIs 120 allow the customers to integrate the services offered by the financial institution into customer websites and applications. The services include a tokenization service, a payment service, an account validation service, and an identity service. The financial institution may distribute a software development kit ("SDK") to allow the customers to better integrate the APIs 120 into their websites and applications.

The financial institution may provide identity verification services to both users and customers through the APIs 120. In some arrangements, the financial institution computing system 102 facilitates registering and authenticating a user with a customer based on user information stored in the financial institution computing system 102 (e.g., within the identity database). For example, a person (i.e., a user) may wish to create an online profile with a merchant that subscribes to the financial institution's APIs (i.e., a customer) in order to purchase a product via the merchant's website. Typically, creating such an online profile requires that the person enters numerous different types of personal information, such as the person's name, address, phone number, date of birth, e-mail address, etc. In some situations, the person may be required to enter payment information, such as a credit card number or bank account information (e.g., a checking account number and a financial institution routing number). However, the merchant may subscribe to the financial institution APIs and implement a registration process employing the APIs 120 and leveraging information relating to the person already stored in the financial institution computing system 102. Accordingly, instead of going through the cumbersome process of manually inputting all of the personal information, the person may have the option to register for an account with the merchant by providing the person's financial institution identification credentials through the financial institution API integrated into the merchant's website. Such a process is described in further detail below with respect to FIGS. 3 through 5. However, prior to being able to do so, the user must register with the financial institution, which is described below with respect to FIG. 2.

Figure 2:
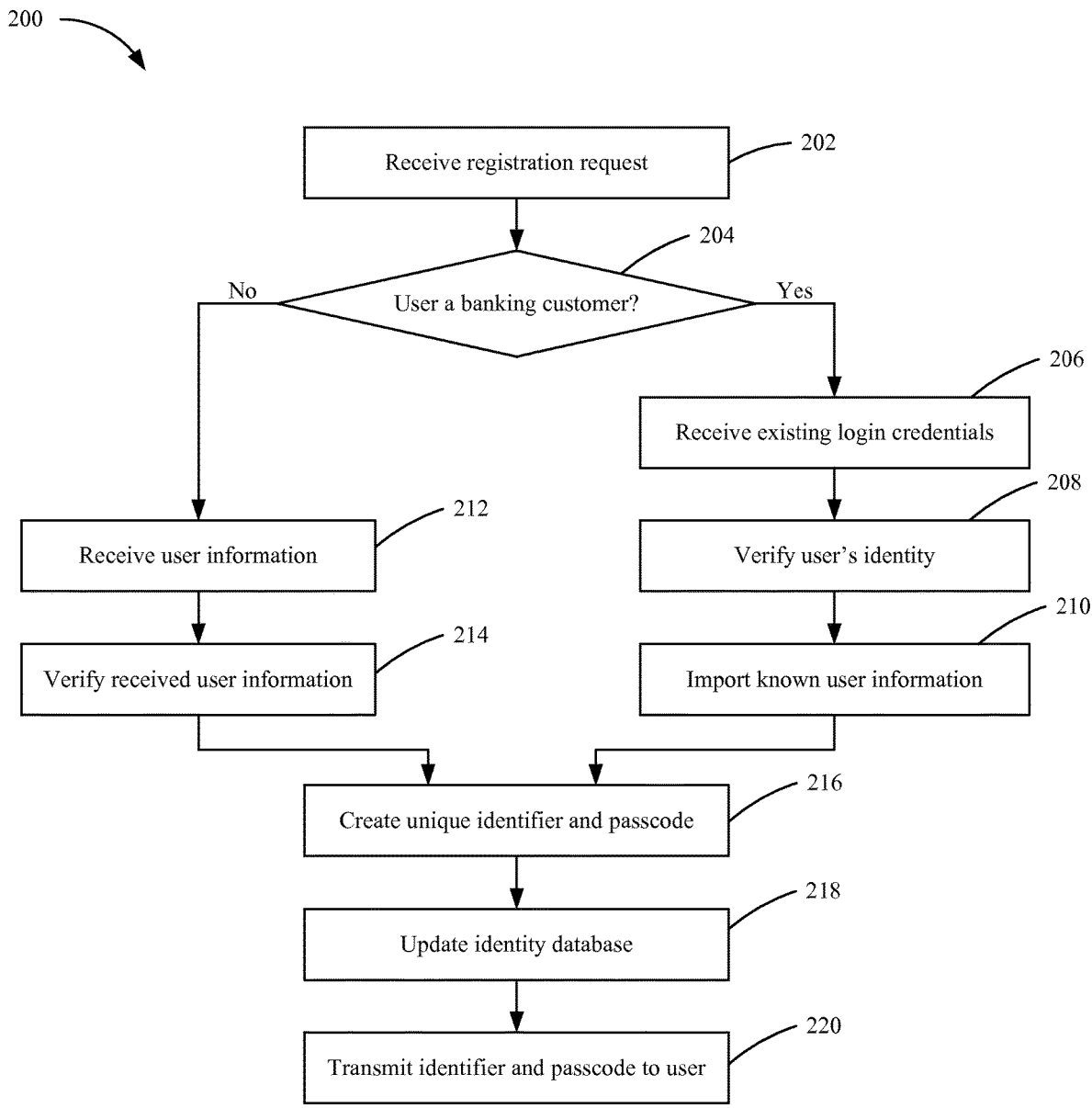
FIG. 2 is a flow diagram of a method of registering a user with a financial institution for an identity service provided by the financial institution according to an exemplary embodiment.

Referring to FIG. 2, a flow diagram of a method 200 of registering a user with the financial institution for the identity service provided by the financial institution is shown according to an exemplary embodiment. Method 200 is performed by a processor of the financial institution computing system 102. Method 200 begins when a registration request is received (202). The registration request is sent by a user via a user computing device 106 and is received at the processor. The registration request includes an indication that the user wants to sign up to use the identification services provided by the financial institution. In some arrangements, the registration request may include an indication that the user is already a banking customer of the financial institution (e.g., an account holder).

The financial institution determines whether the user is an existing banking customer (204). In some arrangements, the user may be an account holder with the financial institution. As described in further detail, if the user is an account holder with the financial institution, the user may not be required to provide as much information to the financial institution during the registration process than if the user is not an existing account holder with the financial institution.

If the user is an existing banking customer, the financial institution receives existing login credentials from the user (206). The existing login credentials may be received at 202 with the registration request. The login credentials relate to at least a username and a password. The login are normally used by the user to log into an online banking portal provided by the financial institution computing system 102. The online banking portal allows the user to access his accounts with the financial institution.

After receiving the login credentials, the user's identity is verified (208). The processor of the financial institution computing system 102 compares the received login credentials to verified login credentials stored in within the financial institution computing system (e.g., in the account database). The user is verified if the received login credentials match the stored login credentials. The user is not verified if the received login credentials do not match the stored login credentials. If the user is not verified, the financial institution computing system 102 may prompt the user to reenter the login credentials restart method 200.

After the user is verified, known user information is imported (210). Since the user is an existing banking customer, the user has already gone through the onboarding process for opening an account with the financial institution. During the initial onboarding process used by the financial institution to verify the user before permitting the user to become an account holder, the user provides certain personal information, such as legal name, address, contact information, tax identification numbers, social security numbers, and the like. The provided personal information during the onboarding process was previously verified prior to permitting the user to open an account with the financial institution. Accordingly, the user's information already on file with the financial institution has already been received and verified by the financial institution. The verified user information is stored in at least one of the databases 124 of the financial institution computing system 102 (e.g., in the account database). Accordingly, the user's information is pulled from the databases 124 for the purposes of registering the user for the identity service. In some arrangements, additional information associated with the user is pulled from the external services 108.

If the user is not an existing banking customer, the financial institution receives user information (212). The received user information is received at the processor of the financial institution computing system 102. The received user information may include similar information used to board a prospective account holder with the financial institution. Accordingly, the received information may include certain personal information, such as legal name, address, contact information, tax identification numbers, social security numbers, and the like. The user provides the user information via a user interface presented on the user device 106.

The received user information is verified (214). The financial institution computing system 102 verifies the received user information. The financial institution computing system 102 may transmit the received information to at least one external service provider 108, such as the EWS, a credit bureau, or a third-party identification verification service. The external service providers 108 cross-reference known or previously verified information associated with the user to determine if all of the information provided by the user matches the known or previously verified information. In some arrangements, the financial institution computing system 102 may also poll its own databases 124 to compare the received information with known or previously verified information associated with the user. If the provided user information matches known or previously verified information associated with the user, the user information is verified. If the provided user information does not match known or previously verified information associated with the user, the user's request to register may be rejected or the user may be prompted to reenter the requested user information. In other arrangements, the user may be required to meet in person with an analyst of the financial institution at a branch to verify the user's identity in person.

After the user information is imported (at 210) or verified (at 214), a unique identifier and passcode is created for the user (216). The unique identifier and passcode are used by the user to log into the financial institution via a customer's website or application that utilizes the APIs 120. In some arrangements, the created identifier and passcode is different than the credentials received at 206 if the user is also an existing account holder with the financial institution. Hence, if the created identifier and passcode are compromised at a customer computing system, the existing login credentials for the financial institution will not also be compromised. In other arrangements, a unique identifier and passcode is not created if the user is an existing account holder with the financial institution. In such arrangements, the user may use the login credentials received at 206 to provide information to customers (e.g., to a merchant while making a purchase or while registering with the merchant).

The identity database is updated (218). The identity database is one of the databases 124 maintained in the financial institution computing system 102. The processor updates the identity database with the user information (imported at 210 or verified at 214) and associates it with the unique identifier and passcode. The identity database is updated such that when the financial institution computing system 102 receives the unique identifier and passcode via the API gateway 122, the financial institution computing system 102 can provide or verify certain information to customers about registered users. The identifier and the passcode are transmitted to the user (220). The financial institution computing system 102 transmits the identifier and passcode to the user device 106 such that the user can use the identifier and passcode to log into the financial institution computing system 102 via one of the APIs 120. The identifier and passcode may be transmitted as part of an e-mail message, a prompt during a registration process via a financial institution website or application, a text message, or the like.

Figure 3:
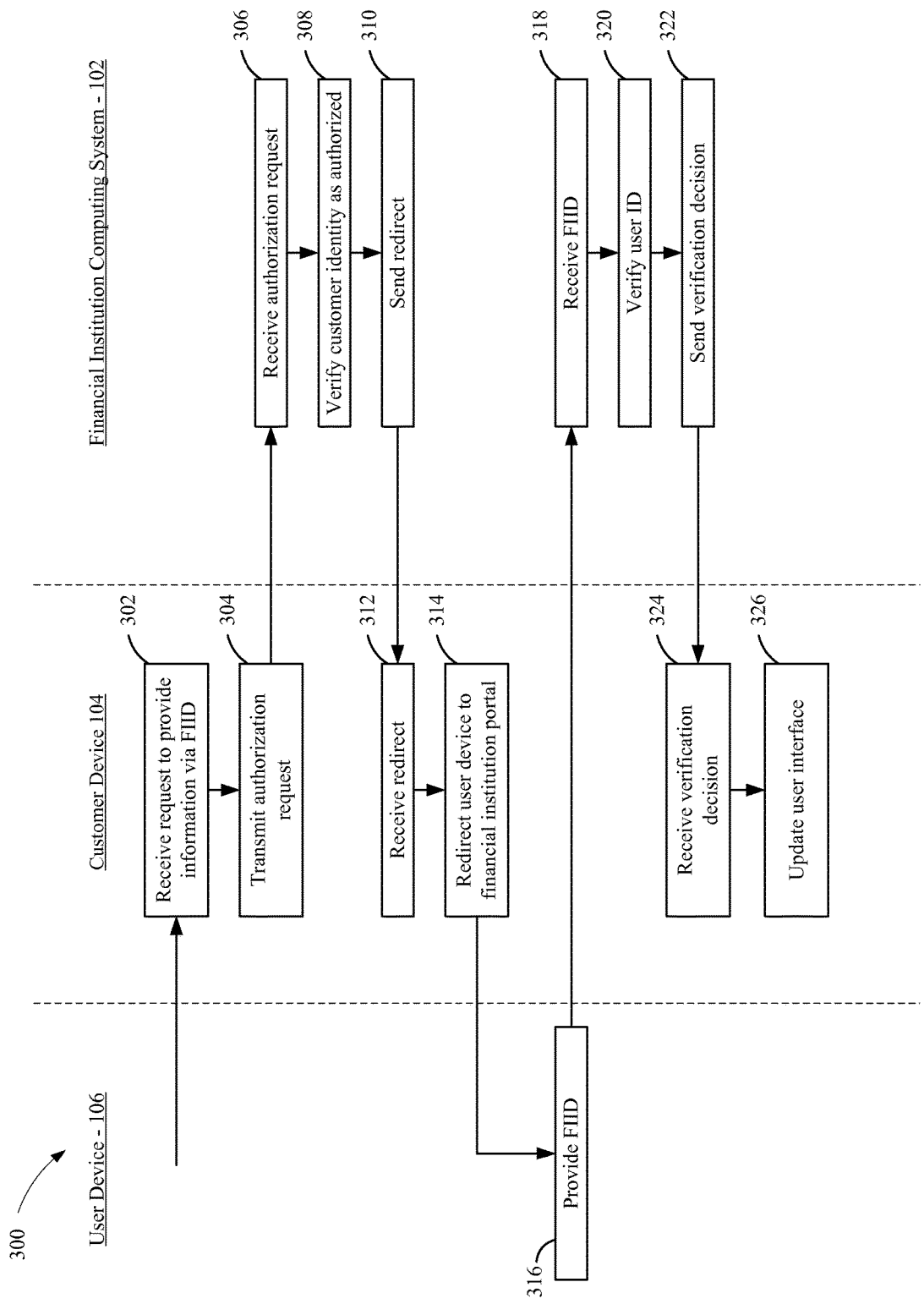
FIG. 3 is an interaction flow diagram of a method of allowing a user to provide verified user information to a customer website or application using a financial institution identification according to an exemplary embodiment.

Referring to FIG. 3, an interaction flow diagram of a method 300 of allowing a user to provide verified user information to a customer website or application using a financial institution identification ("FIID") is shown according to an exemplary embodiment. During method 300, the communications between the financial institution computing system 102, a customer device 104, and a user device 106 are shown. The customer associated with the customer device 104 subscribes to at least one of the API services provided by the financial institution (e.g., APIs 120 provided by the financial institution computing system 102).

Figure 4:
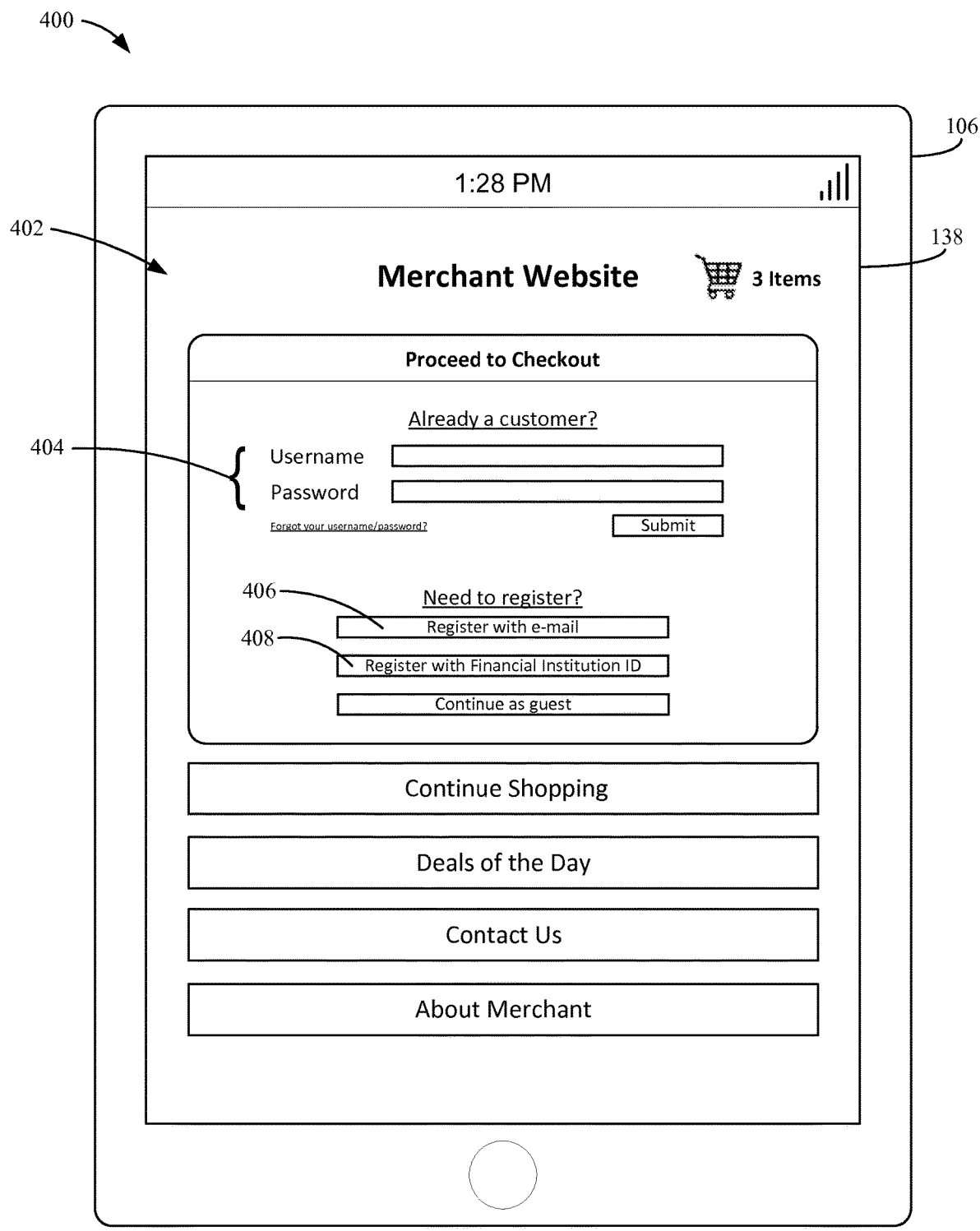
FIG. 4 is a view of a user interface presented on a display of a user device when a user is accessing a login page of a merchant according to an exemplary embodiment.

Method 300 begins when the customer device 104 receives a request to provide information via a user's FIID at 302. The request is received from a user using a user device 106 to access a customer website or customer application (e.g., a smartphone application) hosted or supported by the customer device 104. For example, the request may relate to a user wanting to provide user information while attempting to register for an online shopping account with a merchant (i.e., the customer) or while completing an online transaction with the merchant. The customer's website or application presents the user the option of providing information with the user's FIID (e.g., the unique identifier and passcode created during method 200 as described above). For example, FIG. 4 shows a user interface 400 that may be presented to the user on the display 138 of the user device 106 when the user is accessing the customer's website 402. As shown on the user interface 400, the user can log into the website 402 with a username and password associated with the customer by interacting with area 404, can register for a new username and password associated with the customer by interacting with button 406, or can register with the user's FIID associated with the financial institution by interacting with button 408. When the user interacts with button 408, the request at 302 is received.

After the request is received at 302, the customer device 104 transmits an authorization request to the financial institution computing system 102. The authorization request is transmitted by the customer device 104 to permit access to the APIs 120 of the financial institution computing system 102 to the customer device 104. The authorization request is received by the financial institution computing system 102 at 306. The financial institution computing system verifies the customer device 104 as being associated with a customer that is authorized to access the APIs 120 at 308.

After the customer device 104 is verified, the financial institution computing system 102 then sends a redirect to the customer device 104 at 310. The redirect instructs the customer device 104 to display a login screen associated with the financial institution on the customer's website or application. The login screen allows the user to communicate directly with the financial institution computing system 102 via the customer's website or application. The customer device 104 redirects the user device 106 to the login screen associated with the financial institution at 314. The login screen may be displayed on the customer's website or application as a pop-up window or as an embedded pane within the website or application. The user provides the FIID to the user interface at 316. The FIID may include a unique identifier (e.g., a username) and a passcode or password. The FIID is received by the financial institution computing system 102 at 318. The financial institution computing system 102 verifies the received FIID as belonging to the user at 320. The financial institution computing system 102 transmits a verification decision to the customer device 104 at 322. In some situations, the verification decision indicates that the user is not verified. In such situations, the user did not provide a valid FIID (e.g., a username and password) that matches a verified FIID stored within the financial institution computing system 102. In other situations, the verification decision indicates that the user is verified (e.g., the provided username and password matched the stored FIID information).

The verification decision is received by the customer device 104 at 324. The customer device 104 updates the user interface 400 based on the verification decision at 326. The updated user interface may indicate to the user that the login attempt was successful or unsuccessful depending on the verification decision issued by the financial institution computing system 102. If the login attempt was successful, the user may be automatically registered with the customer's website or application. Alternatively, if the login attempt was successful, the user may be directed to a registration page or another page (e.g., a transaction checkout page) that is prepopulated with information obtained from the financial institution relating to the user (e.g., name, address, phone number, e-mail address, payment information) for the user to review and confirm. The above-described actions of the financial institution computing system 102 during method 300 are described in more detail below with respect to FIG. 5.

Figure 5:
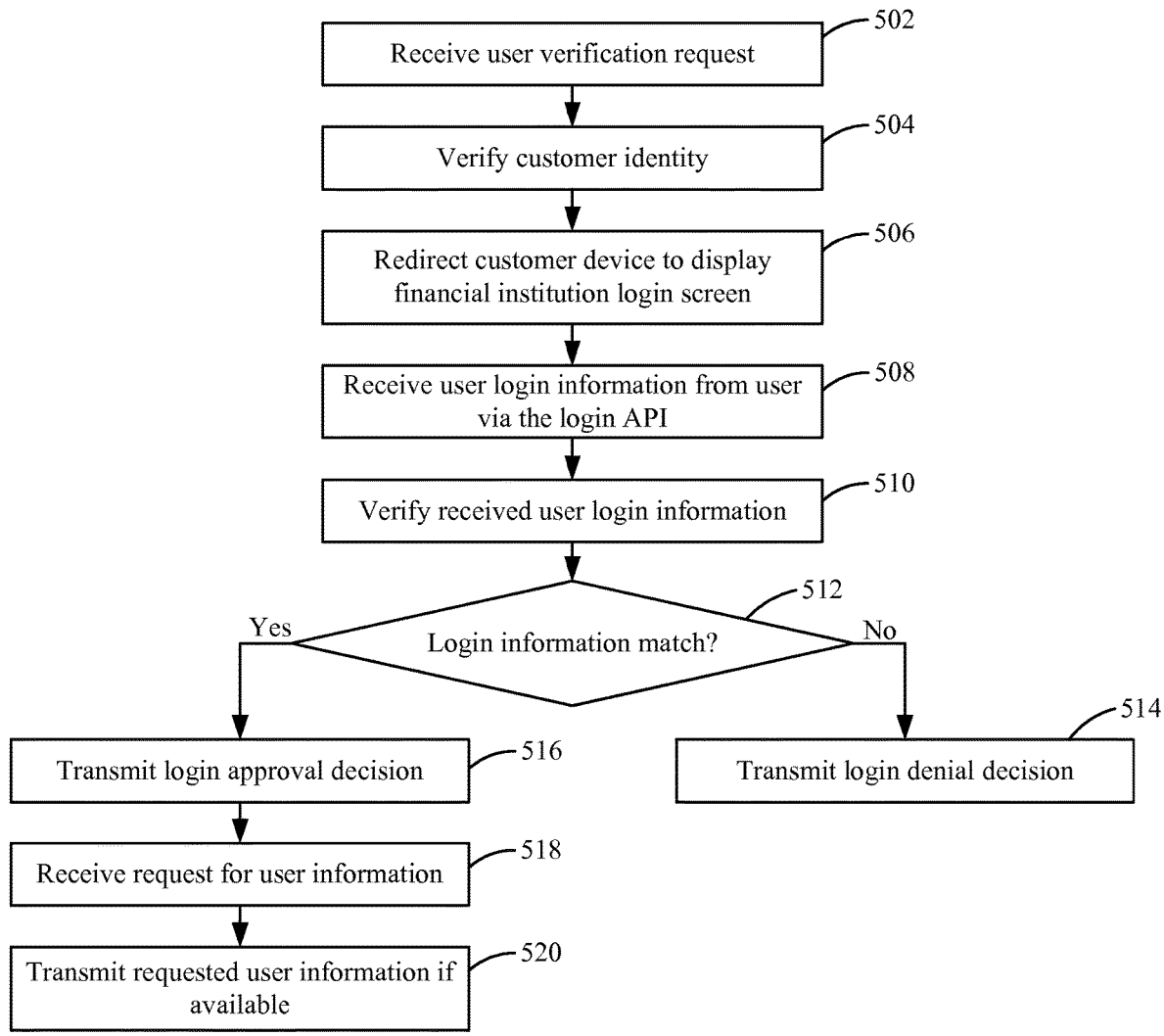
FIG. 5 is a flow diagram of a method of providing verified user information to a customer website or application by the financial institution computing system of FIG. 1 according to an exemplary embodiment.

Referring to FIG. 5, a flow diagram of a method 500 of providing verified user information to a customer website or application by the financial institution computing system 102 is shown according to an exemplary embodiment. The method 500 may be performed as part of method 300 (e.g., as discussed above). A processor of the financial institution computing system 102 performs the method 500.

The method 500 begins when a user verification request is received at 502. The user verification request is received from a customer device 104. The customer device 104 provides a user portal, such as a website or an application (e.g., a smartphone application), accessible by a plurality of user devices 106. The user, via the customer's website or application, can select an option to have certain user information automatically provided to the customer after the user's identity is verified by the financial institution. Accordingly, the request is initiated from the customer's website or application when the user selects an option to have the financial institution provide user information to the customer (e.g., by interacting with button 408 of user interface 400). The request includes an identity of the customer.

After receipt of the request, the financial institution computing system 102 verifies that the customer subscribes to the financial institution's identity verification services at 504. The customer is an entity that subscribes to the financial institution's API services (e.g., the tokenization service, payment service, account validation service, identity service, etc.). In some arrangements, the financial institution computing system 102 verifies the identity of the customer by cross-referencing one of the databases 124 (e.g., the account database, the identity database, the API database, or another database that contains subscriber records). If the customer is not verified as a subscriber to the financial institution's API services, the request is rejected. The remaining description of method 500 presumes that the customer is a subscriber to the financial institution's API services.

After verifying the identity of the customer as a subscriber, the financial institution computing system 102 redirects the customer device 104 to display a financial institution login screen at 506. In some arrangements, the financial institution computing system 102 pushes the financial institution login screen to the customer's website or application via the API integrated into the website or application. The customer incorporates the login API of the financial institution into the website or application. The login API allows the financial institution 102 to display the login screen to the user via the customer's website or application such that the user can provide the login credentials directly to the financial institution computing system 102.

User login information from the user is received via the login API at 508. The user provides the login information into the financial institution login via the customer's website or application as accessed by the customer device 106. The user login information may relate to a username and a passcode. The username and passcode may be the same username and passcode used by the user to log into the financial institution computing system 102 for personal banking purposes.

The received user login information is verified at 510. The financial institution computing system verifies the received user login information by comparing the received user login information against stored user login information (e.g., information stored in the databases 124). The financial institution computing system 102 determines whether the received user login information matches the stored user login information at 512. If the received login information does not match the stored login information, a login denial decision is transmitted at 514. The login denial decision is transmitted by the financial institution computing system 102 to the user device 106 via the API incorporated into the customer's website or application. In some arrangements, the financial institution computing system 102 also transmits the login denial decision to the customer device 104.

If the received login information matches the stored login information, a login approval decision is transmitted at 516. The login approval decision is transmitted by the financial institution computing system 102 to the user device 106 via the API incorporated into the customer's website or application. The financial institution computing system 102 also transmits the login approval decision to the customer device 104. In some arrangements, method 500 ends after the login denial or approval decisions are transmitted at 514 and 516.

In other arrangements, if an approval decision is transmitted at 516, the customer may request certain information associated with the user after the financial institution computing system 102 verifies the user's identity. In such arrangements, a request for user information is received at 518. For example, the user may be requesting to register with the customer by providing the user's FIID instead of manually entering customer information such as the customer's name, address, e-mail address, phone number, birthday, and payment information. After the user has been verified via the user's FIID, the customer can then retrieve the required information from the financial institution computing system 102 instead of requiring the customer to enter information already stored with the financial institution computing system 102. Accordingly, the request for information associated with the user is transmitted from the customer device 104 to the financial institution computing system 102 via the identity API. The request includes the specific types of information requested about the user. The requested types may include any of the user's legal name, the user's contact information (e.g., home address, home phone number, cell phone number, business address, e-mail addresses, etc.), the user's birthday, the user's social security number, the user's tax identification number, the user's payment information (e.g., credit card information, bank account information, etc.), and the like.

Requested user information is transmitted at 520. The financial institution computing system 102 pulls the requested user information from the identity database. In some arrangements, certain user information may be restricted from being automatically provided by the user. For example, the user may restrict customer access to the user's social security number and the user's payment information. In such arrangements, the financial institution may request permission to share the information with the specific customer by transmitting a message to the user device 106 (e.g., via text message, via e-mail message, via the API embedded in the user interface on the customer's website or application, etc.). In further arrangements, certain requested information does not exist and cannot be returned to the customer. For example, the customer may request payment information relating to the user, and the financial institution does not have the information on file. The financial institution computing system 102 transmits the requested information, where available, to the customer device 104. The customer device 104 can use the received information in registering the user with the customer, in completing a purchase order with the customer, or in another manner.

Figure 6:
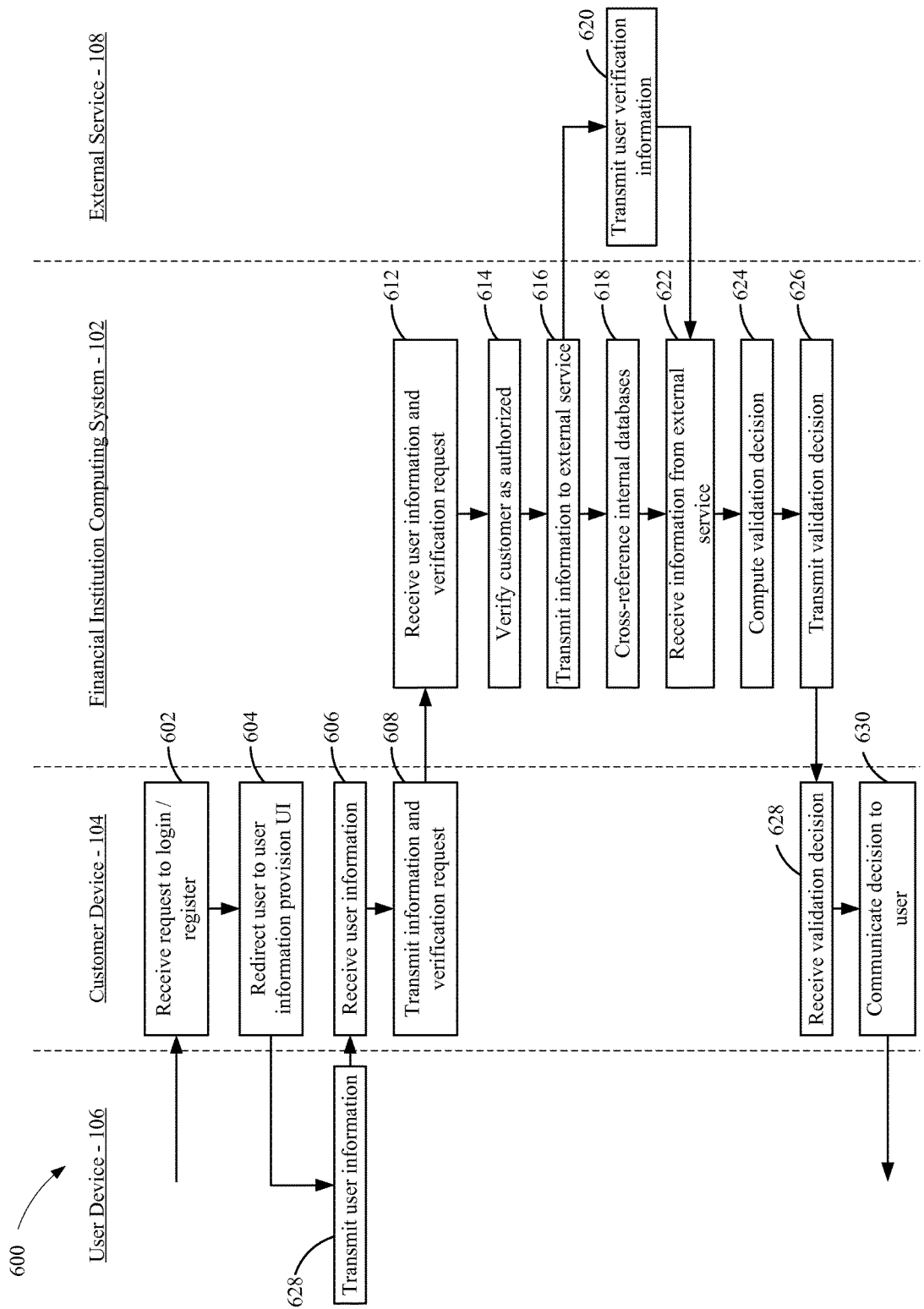
FIG. 6 is an interaction flow diagram of a method of verifying the identity of a user attempting to log into or register with a customer website or application according to an exemplary embodiment.

Referring to FIG. 6, an interaction flow diagram of a method 600 of verifying the identity of a user attempting to log into or register with a customer website or application is shown according to an exemplary embodiment. Method 600 is similar to method 300. Method 600 differs from method 300 in that the user is not attempting to log into or register with the customer with a FIID. Rather, the user is attempting to log into or register with the customer by manually providing personal information relating to the user. Generally, in method 600, the financial institution computing system 102 receives the personal information associated with the user from the customer device 104 and provides verification services based on the received personal information.

Method 600 begins when a request to login or register is received at a customer device 104 at 602. The request is initiated by a user via a user device 106 accessing a website or application hosted by the customer device 104. In some arrangements, the request relates to a request by the user to create an account with the customer. In other arrangements, the request relates to a request by the user to provide personal information for identification purposes (e.g., to complete a purchase with an online storefront of the customer without creating an account with the customer).

After the request is received, the user is redirected to a user information provision interface at 604. The customer device 104 updates the user interface displayed at the user device 106 (e.g., directs the user device 104 to a website). The user interface requests certain personal information relating to the user that is used by the customer to allow the user to log into or register with the customer's website or application. The personal information may include any combination of the user's name, the user's contact information (e.g., mailing addresses, e-mail address, cell phone number, home phone number, work phone number), payment information (e.g., credit card numbers, credit card expiration dates, credit card CCV numbers, credit card billing addresses, bank account numbers, bank routing numbers, PayPal® account information, Google® Wallet account information, etc.), and other identifying information (e.g., social security number, tax identification number, etc.). The information requested from the user may vary depending on the customer and the purpose of the information provision by the user. For example, a first merchant customer may only require the user's name, address, and payment information, while a second merchant customer may require additional information such as the user's social security number.

User information is transmitted at 606. The user provides the requested personal information via the user interface presented to the user on the user device 106. The information is transmitted from the user device 106 to the customer device 104. The user information is received at the customer device 104 at 608. Since the information was provided over a network (e.g., network 110), the customer may not be certain as to whether the user is actually the user indicated by the provided personal information. To help verify the user's identity, the customer may subscribe to the financial institution's identity service API. Accordingly, the user information and verification request is transmitted at 610. The user information and a verification request is transmitted from the customer device 104 to the financial institution computing system 102. As described in further detail below, the financial institution computing system 102 provides an identity verification service by cross-referencing the received user information with stored user information and by polling at least one external service 108 (e.g., EWS, credit bureaus, etc.) for additional verification information.

The user information and verification request is received at 612. The request is transmitted by the customer device 104 and received by the financial institution computing system 102. The request includes the identity of the customer and the user information provided to the customer device 104 by the user. Based on the identity of the customer, the financial institution computing system 102 verifies the customer as an authorized customer at 614. The customer is an authorized customer if the customer subscribes to the financial institution's identity service API. If the customer is not an authorized customer, the request is rejected. The remaining description of method 600 presumes that the customer is an authorized customer.

The received user information is transmitted at 616. The financial institution computing system 102 transmits the received user information to an external service 108 (e.g., EWS, credit bureaus, etc.). In some arrangements, the transmitting of 616 and the receiving of 622 (described below) are skipped if the financial institution has enough internal data associated with the user (e.g., in the databases 124) to verify the identity of the user without reaching out to any external services 108.

The received user information is cross-referenced with information stored in the internal databases 124 at 618. The financial institution computing system 102 references its own internal databases 124 to locate any information that may be available within the databases 124 about the user. For example, the user may indicate that his name is "Greg Johnson" and that his address is "1234 Maple St., Minneapolis, Minn." The financial institution computing system 102 may scan its databases 124 for matching entries relating to a Greg Johnson residing in Minnesota. If there is a match in the databases 124, the other provided information (e.g., phone numbers, e-mail addresses, payment information, etc.) can be compared with the remaining information provided by the user to the customer. The search of the databases 124 is not limited to starting with the provided user's name or address. For example, the search can be based on an e-mail address, a phone number, a credit card number, a social security number, or any other individual piece of information received by the customer at 612. The external service 108 also cross-references the received user information with its own internal databases. The external service 108 transmits user verification information back to the financial institution computing system 102 at 620. The verification information is received from the external service 108 at 622. The verification information includes information indicating whether or not the provided user information matches known user information (e.g., previously verified user information) and an indication of any possible discrepancies in the provided user information.

A validation decision is computed at 624. The validation decision is computed by the financial institution computing system 102 based on the verification information received from the external service 108 at 622 and the cross-referencing of the internal databases 124 performed at 618. As described in further detail below, the validation decision can take multiple different forms depending on customer preferences and various agreements between the customers and the financial institution.

In some arrangements, the validation decision is a yes or a no. A yes validation decision corresponds with an indication that the provided user information is verified as belonging to the user. A no validation decision corresponds with an indication that the provided user information is not verified as belonging to the user. A yes validation decision is determined when all of the provided user information matches known user information. In some arrangements, a yes validation is also determined when a certain percentage of the provided user information matches known user information. For example, a yes validation decision may be determined if nine out of ten pieces of provided user information matches known user information. In further arrangements, a yes validation is also determined when certain key pieces (e.g., social security number, bank account numbers, name, and other pieces of user information designated by the customer as key pieces of information) match known user information.

The specifics of what scenarios qualify as a yes validation instead of a no validation may be set by the customer in a set of business rules provided to the financial institution. The sets of business rules may vary from customer to customer. Some customers are more risk averse than other customers. For example, a first customer may require that 100% of the information provided by the user at 602 match known user information identified by the financial institution computing system 102 and the external service 108. However, a second customer only requires that 75% of the provided user information matches known user information. Further, a third customer may require that at least 75% of the provided user information matches and that the provided social security number match. So, if the user provides ten pieces of user information, including a social security number, and eight of the ten pieces of the provided information match with known user information with one of the two non-matching pieces of information being the user's social security number, a yes validation decision would be provided to the second customer, while the first and third customers would receive no validation decisions. Accordingly, the different business rules set by each individual customer may cause the same user to be verified or not verified despite the user's provision of the same information to each customer.

In providing the yes or no validation decision, the financial institution may agree to take on a designated amount of liability associated with the provision of an incorrect user validation. For example, the financial institution may agree that if it incorrectly validates a user and the user turns out to enter into a fraudulent transaction with the customer, the financial institution may reimburse the customer or the individual whose identity was misappropriated by the user for a portion or all of the damages associated with the fraudulent transaction. The financial institution may receive additional compensation from the customer in situations in which the financial institution agrees to take on a designated amount of the liability.

In other arrangements, the validation decision is a validation score. The score is computed based on the amount of provided information that matches the known information. The score may also take into account certain information that was not provided by the user that is considered important in providing a proper validation decision (e.g., if the user did not provide an address or a phone number). Unlike the yes or no validation decision, the validation score may be a non-definitive indication of the likelihood that the user is the individual the user purports to be. In other words, the validation score is an indication as to the chances the user is fraudulently misrepresenting himself as a different person by providing false information to the customer. The validation score may be a grade (e.g., A, B, C, D, E, etc.), a number on a scale (e.g., nine out of ten, ninety out of one hundred, etc.), or a percentage (e.g., 50%, 60%, 70%, etc.). The type of scores may be different for different customers. The specifics of how the validation scores are calculated may be defined by the customer in a set of business rules provided to the financial institution. The sets of business rules may vary from customer to customer. For example, a first customer may place the same level of weight on each piece of received information in defining how the validation score is calculated, while a second customer places a higher level of weight on certain pieces of information, such as the user's social security number or payment information, than on other pieces of information, such as the user's name and address.

The validation decision is transmitted at 626. The financial institution computing system 102 transmits the validation decision to the customer device 104 via the API. The validation is received by the customer device 104 at 628. The customer device 104 communicates the validation decision to the user at 630. In situations where the validation decision corresponds to a validation score, the customer may need to convert the score into a yes or no based on the customer's own internal rules. The validation decision may be communicated to the user by simply indicating that the transaction is completed or cannot be completed or by indicating that the registration was successful or unsuccessful.

Figure 7:
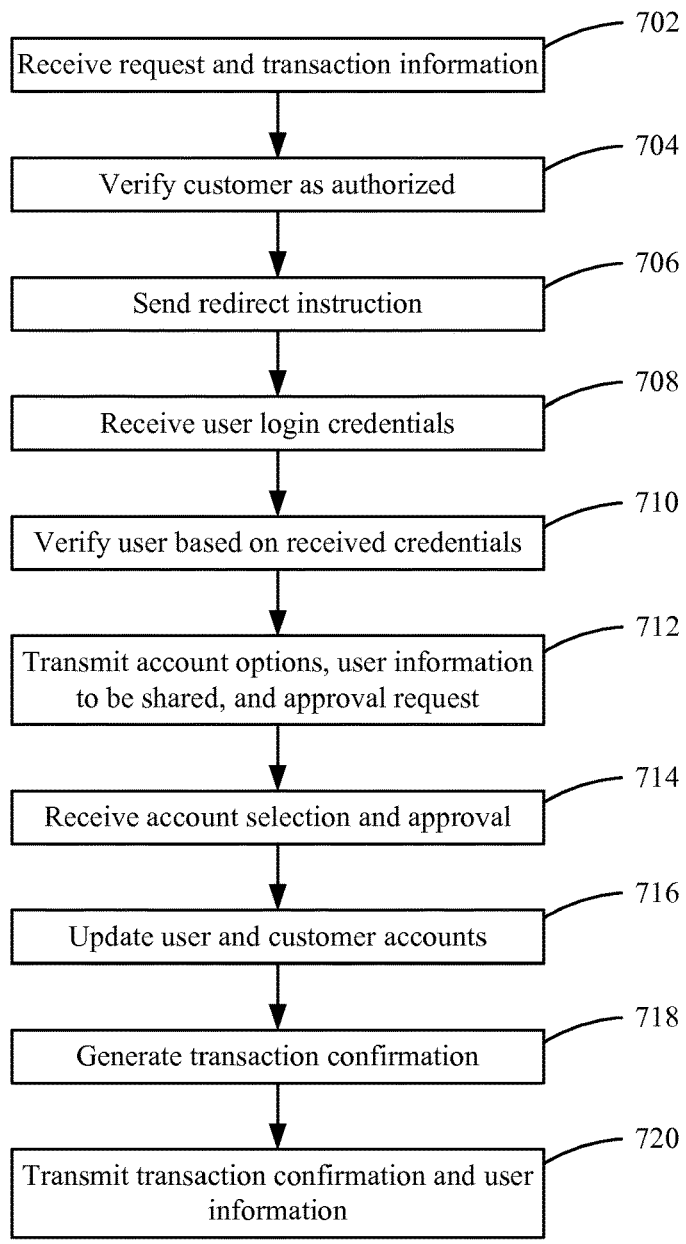
FIG. 7 shows a flow diagram of a method of facilitating a payment between a user and a customer according to an exemplary embodiment.

Referring to FIG. 7, a flow diagram of a method 700 of facilitating a payment between a user and a customer according is shown to an exemplary embodiment. Method 700 is performed by the financial institution computing system 102 (e.g., by a processor and through other components, such as the network interface logic 114 and the API gateway 122). During method 300, the communications between the financial institution computing system 102, a customer device 104, and a user device 106 are described. Generally, method 700 provides a secure way for a user (e.g., an individual consumer) to pay for a good or service from a customer (e.g., a merchant) without directly providing payment information to the customer. The payment is facilitated by the financial institution as described below. The customer associated with the customer device 104 subscribes to at least the payment service API provided by the financial institution.

Method 700 begins when a request and transaction information are received at 702. The request and transaction information are received by the financial institution computing system 102 from the customer device 104. The request includes an indication that a user (i.e., a customer) would like for the financial institution to facilitate payment from the user to the customer. The request also includes information concerning the transaction. The information concerning the transaction may include an amount of the transaction, an identity of the customer, a description of what the transaction is for (e.g., specific goods or services being purchased by the user, known information about the user, etc.), types of accepted payment, and the like. In some arrangements, the transaction information also includes an identification of certain information that the merchant needs regarding the user, such as the user's name, shipping address, billing address, payment information, and the like.

Figure 8:
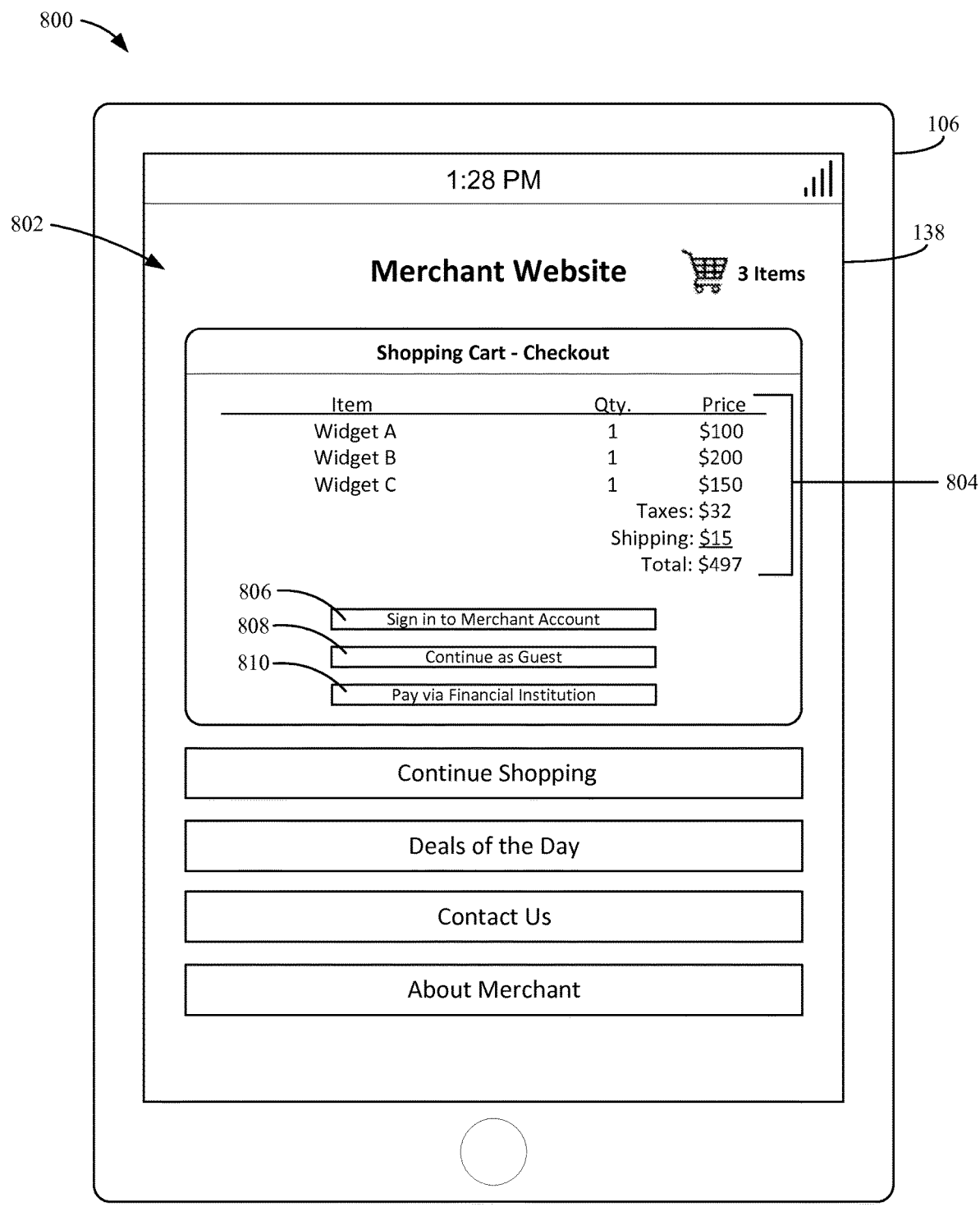
FIG. 8 is a view of a user interface presented on a display of a user device when a user is checking out at an online store of a merchant according to an exemplary embodiment.

The request and transaction information received at 702 is sent from the customer device 104 in response to a selection by the user. The customer's website or application presents the user various options to complete a checkout process (i.e., to provide payment information and user information to complete a purchase). As shown in FIG. 8, a view of an exemplary user interface 800 presented on the display 138 of the user device 106 when a user is checking out at an online store of a merchant (e.g., a customer) is shown. The user interface is part of a website or an application associated with a customer. The user interface 800 includes a checkout screen 802. The checkout screen 802 presents the user shopping cart information 804, which includes the items being purchased from the merchant and the costs associated with the shopping cart. To complete the purchase, the user is presented with three options: signing into a merchant account (by interacting with button 806), continuing the transaction as a guest (by interacting with button 808), and paying via the financial institution (by interacting with button 810). Completing the purchase by signing into the merchant account or by completing the transaction as a guest requires the guest to reveal payment information (e.g., account numbers, billing addresses, routing numbers, etc.) to the merchant and also may require that the user take the time to enter personal information (e.g., name, addresses, phone numbers, e-mail addresses, etc.). In some situations, the user may not wish to reveal this information or spend the time entering this information into the customer's website. For example, the user may be worried about the security of transmitted payment information and the risk that the payment information is compromised by hackers that hack into the customer device 104. Accordingly, the user may select the "Pay via Financial Institution" button 810 to have the financial institution computing system 102 facilitate the payment and provision of the user's personal information because the user has a higher level of trust in the financial institution computing system 102 than the customer device 104. Accordingly, the API system provides a higher level of security for the user in transacting with the customer.

Referring again to FIG. 7, after the request and transaction information are received at 702, the customer is verified as authorized at 704. The financial institution computing system 102 verifies that the customer subscribes to the financial institution's payment and identity verification services. The customer is an entity that subscribes to the financial institution's API services (e.g., the tokenization service, payment service, account validation service, identity service, etc.). In some arrangements, the financial institution computing system 102 verifies the identity of the customer by cross-referencing one of the databases 124 (e.g., the account database, the identity database, the API database, or another database that contains subscriber records). If the customer is not verified as a subscriber to the financial institution's API services, the request is rejected. The remaining description of method 700 presumes that the customer is a subscriber to the financial institution's API services.

After verifying the identity of the customer as a subscriber, the financial institution computing system 102 redirects the customer device 104 to display a financial institution login screen at 706. In some arrangements, the financial institution computing system 102 pushes the financial institution login screen to the customer's website or application via the API integrated into the website or application. The customer incorporates the login API of the financial institution into the website or application. The login API allows the financial institution 102 to display the login screen to the user via the customer's website or application such that the user can provide the login credentials directly to the financial institution computing system 102 (i.e., such that the provided data is not visible or stored.

User login credentials from the user are received at 708. The user provides the login credentials into the financial institution login via the customer's website or application as accessed by the customer device 106. The user login credentials may relate to a username and a passcode. The username and passcode may be the same username and passcode used by the user to log into the financial institution computing system 102 for personal banking purposes. In some arrangements, the login credentials were provided by the financial institution computing system at 220 of method 200. The user is verified based on the received user login credentials 710. The financial institution computing system verifies the identity of the user by comparing the received user login credentials against stored user login information (e.g., information stored in the databases 124). The financial institution computing system 102 determines whether the received user login credentials match the stored user login information. If the received login information does not match the stored login information, a login denial may be transmitted. The login denial decision is transmitted by the financial institution computing system 102 to the user device 106 via the API incorporated into the customer's website or application. In some arrangements, the financial institution computing system 102 also transmits the login denial decision to the customer device 104.

After the user is verified, account options and any customer information requests are transmitted to the user for selection and approval at 712. The user may have multiple different payment options stored with the financial institution. The payment options may include financial accounts owned by the user that are maintained by the financial institution, such as a checking account or a credit card. The payment options may include accounts owned by the user that are maintained by other financial institutions, such as a credit card issued by a different financial institution. The user selects which account to use to fund the transaction. Additionally, at 712, the financial institution requests approval to provide the customer with certain information requested by the customer at 702. For example, the customer may be requesting the user's name, shipping address, billing address, phone number, and e-mail address. In such an arrangement, the customer can select from stored information (e.g., interacting with dropdown menus to select the appropriate addresses, phone numbers, and e-mail addresses from information already stored with the financial institution) or enter new personal information to be sent to the customer. Still further, at 712 the customer approves the transaction. The customer interacts with the user interface to transmit the account selection, the user information, and the transaction approval, which are received by the financial institution computing system 102 at 714.

The appropriate user and customer accounts are updated at 716. In some arrangements, both the user and the customer are account holders with the financial institution. In such arrangements, the financial institution computing system 102 credits the account balance of the customer and debits the account balance of the user to account for the transaction. When both the customer and the user are account holders, the transaction may be performed in real time (i.e., without the delays associated with credit card processing or ACH payment processing). Accordingly, funds are immediately available to the customer and are immediately removed from the user's account. In other arrangements, just the customer is an account holder with the financial institution. In such arrangements, the customer's account balance is credited and an ACH transfer from the user's account with another financial institution or a credit card transaction on the user's credit card is initiated by the financial institution computing system 102. The credit applied to the customer's account balance may be placed on hold until the ACH transfer or credit card transaction is confirmed or completed. The account balances may be stored in the databases 124 of the financial institution computing system 102 (e.g., the account database). In some arrangements, updating the accounts is the final step of method 700.

A transaction confirmation is generated at 718. The transaction confirmation includes an indication that the funds transfer from the user to the customer was successful. The indication may be a confirmation number or confirmation code. In some arrangements, the transaction confirmation additionally includes requested user information (i.e., the user information requested by the customer with the initial request at 702). In such arrangements, the user information may be provided according to method 500 as described above. The transaction confirmation is transmitted at 720. The transaction confirmation is transmitted from the financial institution computing device 102 to the customer device 104. In some arrangements, the transaction confirmation is also transmitted from the financial institution computing device 102 to the user device 106. In such arrangements, the transaction confirmation may be redacted to remove some customer specific information (e.g., customer account number, customer account balance, user information, and the like).

The above-described computing system 100 and methods 200, 300, 500, 600, and 700 provide various identity and payment services to customers and users of the financial institution through the financial institution APIs 120. The identity services include user verification services that verify whether or not an individual accessing a customer's website or application is the person the individual claims they are thereby providing a higher level of accuracy and security to both the users and the customers. The payment services include processing payments from users to customers through the financial institution computing system 102. Accordingly, the API services help prevent fraudulent transactions due to identity theft. Further, the API services allow users to avoid repeatedly entering the same personal information to multiple entities (e.g., multiple merchants) during user registration or checkout procedures. This results in more secure transactions that are initiated quicker. Further, if both the customer and the user are account holders with the financial institutions, the actual transfer of funds from the user to the customer may occur quicker than a standard payment form (e.g., a credit card payment or an ACH payment).

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A method, implemented by a financial institution computing system of a financial institution, for providing an identity service via one or more application programming interfaces (APIs) of the financial institution, the method comprising:
   receiving, by the financial institution computing system, a verification request transmitted by a customer device to the financial institution computing system in response to a selection input into a user device, via a graphical user interface displayed on the user device by a website or mobile application being provided by the customer device and being accessed by the user device, to verify identity by providing login credentials directly to the financial institution computing system;
   transmitting to the customer device, by the financial institution computing system, a redirect instruction causing the customer device to display on the user device, in a pop-up window or embedded pane within the website or mobile application, a login screen of the financial institution;
   receiving, by the financial institution computing system, directly from the user device and bypassing the customer device by using a financial institution API integrated into the website or mobile application, user login credentials entered into the login screen being displayed in the pop-up window or embedded pane within the website or mobile application;
   verifying, by the financial institution computing system, the user login credentials that were received directly from the user device; and
   in response to verification of the user login credentials, transmitting, by the financial institution computing system, a login approval decision to at least one of the user device and the customer device to indicate that login was successful.

2. The method of claim 1, wherein verifying the user login credentials comprises cross-referencing the login credentials with stored login information in an internal identity database of the financial institution computing system.

3. The method of claim 2, wherein the login approval decision is based at least in part on the results of the cross-referencing.

4. The method of claim 1, further comprising verifying that the customer subscribes to the identity service provided by the financial institution before transmitting the redirect instruction to the customer device.

5. The method of claim 1, wherein the user is not an account holder with the financial institution.

6. The method of claim 1, wherein the customer device is a merchant device providing goods or services via a merchant's online storefront presented by the website or mobile application, wherein the user device is a consumer device engaging in a transaction with the merchant device, and wherein the merchant subscribes to the identity service of the financial institution to be able to receive verified user information without requiring consumers to enter personal information via the website or mobile application.

7. The method of claim 1, further comprising receiving a request from the user device of the user to register the user for the identity service provided by the financial institution computing system.

8. The method of claim 7, further comprising:
   requesting user information from the user device and verifying the user information;
   in response to verification of the user information, registering the user for the identity service.

9. The method of claim 8, further comprising making the identity service accessible to the user via the login credentials.

10. The method of claim 8, wherein verifying the user information comprises:
   transmitting the user information to an external service provider device of an external service provider; and
   receiving verification information from the external service provider device, wherein the verification information indicates whether the provided user information matches known user information and an indication of any discrepancies in the user information.

11. The method of claim 10, wherein verifying the user information further comprises calculating a validation score based at least in part on the verification information received from the external service provider device, wherein the validation score is an indication as to the chances the user is fraudulently misrepresenting the user information.

12. The method of claim 7, wherein the login credentials are verified to confirm that the user has subscribed to the user identity service.

13. The method of claim 12, wherein the login credentials are a second set of login credentials associated with the identity service, the method further comprising:
   receiving a first set of login credentials associated with an existing account at the financial institution; and
   in response to verification of the first set of login credentials, registering the user for the identity service and making the identity service accessible via the website or the mobile application using the second set of login credentials.

14. The method of claim 1, further comprising, before the verification request is received, receiving a request from the customer device of the customer to subscribe to the identity service.

15. The method of claim 1, further comprising receiving a request from the customer device requesting that the financial institution computing system provide the customer device with information about the user.

16. The method of claim 15, further comprising transmitting to the customer device the user information for use by the customer device in transacting with the user device.

17. The method of claim 15, further comprising receiving from the user device, during registration of the user for the identity service, an indication of user information that is restricted from being provided to the customer device.

18. The method of claim 17, wherein the customer device requests information restricted by the user, and wherein the method further comprises transmitting a message to the user device to request permission to provide the customer device with the restricted user information.

19. The method of claim 18, further comprising receiving permission from the user device to provide the customer device with restricted user information, and transmitting to the customer device the restricted user information.

20. A financial institution computing system associated with a financial institution, the system comprising:
   a network interface configured to communicate, via a network, with a customer device of a customer who has subscribed to an identity service of the financial institution;
   an account database storing information relating to a plurality of financial accounts maintained by the financial institution;
   an identity database storing login credentials for a plurality of users;
   a memory; and
   at least one processor configured to:
      receive a verification request from the customer device transmitted by a customer device to the financial institution computing system in response to a selection input into the user device, via a graphical user interface displayed on the user device by a website or mobile application being provided by the customer device and being accessed by the user device, to verify identity by providing login credentials directly to the financial institution computing system;
      transmit to the customer device a redirect instruction causing the customer device to display on the user device, in a pop-up window or embedded pane within the website or mobile application, a login screen of the financial institution;
      receive, directly from the user device and bypassing the customer device through use of a financial institution API integrated into the website or mobile application, user login credentials entered into the login screen being displayed on the user device in the pop-up window or embedded pane within the website or mobile application;
      verify the user login credentials that were received directly from the user device; and
      transmit a login approval decision to at least one of the user device and the customer device, wherein the login approval decision indicates whether login was successful.

21. The system of claim 20, wherein the at least one processor is configured to verify the login credentials of the user by cross-referencing the login credentials with login information stored in the internal identity database of the financial institution computing system.

22. The system of claim 21, wherein the login approval decision is based at least in part on the results of the cross-referencing.

23. The system of claim 20, wherein the at least one processor is further configured to receive a request from the customer device requesting that the financial institution computing system provide the customer device with information about the user.

24. The system of claim 23, wherein the at least one processor is further configured to:
   receive from the user device, during registration of the user for the identity service, an indication of user information that is restricted from being provided to the customer device, wherein the customer device requests user information restricted by the user;
   transmit a message to the user device to request permission to provide the customer device with the restricted user information;
   receive permission from the user device to provide the customer device with restricted user information; and
   transmit the restricted user information to the customer device.

25. A non-transitory computer readable medium with computer-executable instructions embodied thereon that, when executed by a processor of a financial institution computing system, cause the financial institution computing system to perform a process for providing an identity service, the process comprising:
   receiving, by the financial institution computing system, a verification request from a customer device of a customer who subscribes to the identity service, the verification request transmitted by the customer device to the financial institution computing system in response to a selection input into the user device, via a graphical user interface displayed on the user device by a website or mobile application being provided by the customer device and being accessed by the user device, to verify identity by providing login credentials directly to the financial institution computing system;

transmitting to the customer device, by the financial institution computing system, a redirect instruction causing the customer device to display on the user device, in a pop-up window or embedded pane within the website or the mobile application, a login screen of the financial institution;

receiving, by the financial institution computing system, directly from the user device and bypassing the customer device through use of a financial institution API integrated into the website or mobile application, user login credentials entered into the login screen of the financial institution being displayed on the user device in the pop-up window or embedded pane within the website or mobile application;

verifying, by the financial institution computing system, the user login credentials that were received directly from the user device; and transmitting, by the financial institution computing system, a login approval decision to at least one of the user device and the customer device, wherein the login approval decision indicates whether login was successful.

* * * * *